US012618346B2

(12) United States Patent
Han et al.

(10) Patent No.: US 12,618,346 B2
(45) Date of Patent: May 5, 2026

(54) THERMAL STORAGE MATERIALS AND APPLICATIONS THEREOF

(71) Applicant: BRANDEIS UNIVERSITY, Waltham, MA (US)

(72) Inventors: Ggoch Ddeul Han, Waltham, MA (US); Michael A. Gerkman, Waltham, MA (US)

(73) Assignee: BRANDEIS UNIVERSITY, Waltham, MA (US)

( * ) Notice: Subject to any disclaimer, the term of this patent is extended or adjusted under 35 U.S.C. 154(b) by 1058 days.

(21) Appl. No.: 17/608,534

(22) PCT Filed: May 4, 2020

(86) PCT No.: PCT/US2020/031344
§ 371 (c)(1),
(2) Date: Nov. 3, 2021

(87) PCT Pub. No.: WO2020/227227
PCT Pub. Date: Nov. 12, 2020

(65) Prior Publication Data

US 2022/0220871 A1 Jul. 14, 2022

Related U.S. Application Data

(60) Provisional application No. 62/843,136, filed on May 3, 2019.

(51) Int. Cl.

| | |
|---|---|
| ***F01M 11/00*** | (2006.01) |
| ***C08F 4/04*** | (2006.01) |

(Continued)

(52) U.S. Cl.
CPC ........... *F01M 11/0004* (2013.01); *C08F 4/04* (2013.01); *C09K 5/063* (2013.01); *F01M 5/021* (2013.01);
(Continued)

(58) Field of Classification Search
CPC .... F01M 11/0004; F01M 5/021; F01M 5/001; F01M 2005/008; F01M 2011/0025;
(Continued)

(56) References Cited

U.S. PATENT DOCUMENTS

| | | | |
|---|---|---|---|
| 4,159,265 A | 6/1979 | Sommer et al. | |
| 10,390,531 B2 | 8/2019 | Doyle et al. | |

(Continued)

FOREIGN PATENT DOCUMENTS

| | | | |
|---|---|---|---|
| FR | 2721975 A1 | 1/1996 | |
| WO | WO-2015013755 A1 * | 2/2015 | ......... B01D 53/1425 |

(Continued)

OTHER PUBLICATIONS

Machine Translation of WO 2015013755 A1 PDF File Name: "WO2015013755A1_Machine_Translation.pdf" (Year: 2015).*

(Continued)

*Primary Examiner* — Grant Moubry
*Assistant Examiner* — Ruben Picon-Feliciano
(74) *Attorney, Agent, or Firm* — CANTOR COLBURN LLP

(57) ABSTRACT

The present invention relates to automotive products, as well as uses thereof, which can facilitate warming of engine oil in an energy efficient and, therefore, more environmentally friendly manner. More specifically, a fluid reservoir is disclosed that includes a double walled vessel that defines a fluid containing compartment and has a self-contained region that shares a wall with the fluid containing compartment. A composition in the self-contained region at least partially covers the shared wall surface, and one or more light sources are positioned in the self-contained region to induce a phase change in the composition. The composition
(Continued)

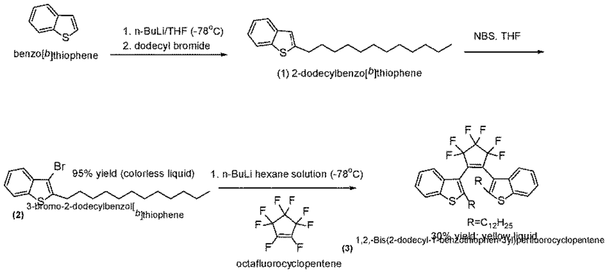

benzo[b]thiophene
(1) 2-dodecylbenzo[b]thiophene
(2) 3-bromo-2-dodecylbenzo[b]thiophene
octafluorocyclopentene
R=$C_{12}H_{25}$
(3) 1,2,-Bis(2-dodecyl-1-benzothiophen-3yl)perfluorocyclopentene

SM1
SM2 includes a phase-change material (PCM) and a molecular switch material. This fluid reservoir can be used to heat oil in an engine or oil pan.

8 Claims, 6 Drawing Sheets

(51) Int. Cl.
*C09K 5/06* (2006.01)
*F01M 5/00* (2006.01)
*F01M 5/02* (2006.01)

(52) U.S. Cl.
CPC ....... *F01M 5/001* (2013.01); *F01M 2005/008* (2013.01); *F01M 2011/0025* (2013.01); *F01M 2011/0045* (2013.01)

(58) Field of Classification Search
CPC ............. F01M 2011/0045; F01M 5/00; F01M 2011/0016; F01M 2011/0087; C08F 4/04; C09K 5/063
See application file for complete search history.

(56) References Cited

U.S. PATENT DOCUMENTS

| | | | | |
|---|---|---|---|---|
| 2007/0211110 | A1 | 9/2007 | Iftime et al. | |
| 2008/0066982 | A1 | 3/2008 | Kobayashi et al. | |
| 2009/0227748 | A1 * | 9/2009 | Jones | C07F 17/00 502/103 |
| 2013/0202538 | A1 | 8/2013 | Herges et al. | |
| 2017/0158898 | A1 | 6/2017 | Xiao et al. | |
| 2017/0248375 | A1 | 8/2017 | Blair et al. | |
| 2018/0347419 | A1 | 12/2018 | Furuishi et al. | |

FOREIGN PATENT DOCUMENTS

| | | | |
|---|---|---|---|
| WO | 2021/158638 | A1 | 8/2021 |
| WO | 2022/169879 | A1 | 8/2022 |

OTHER PUBLICATIONS

European Search Report for application EP 20801679, dated Sep. 22, 2023, 8 pages.
International Search Report and Written Opinion for PCT/US2020/031344 (mailed Aug. 2020).
Han et al., "Optically-controlled Long-term Storage and Release of Thermal Energy in Phase-change Materials," Nature Communications 8(1):1446 (2017).
Han et al., "Optically-regulated Thermal Energy Storage in Diverse Organic Phase-change Materials," Chem. Commun. 54:10722 (2018).
International Preliminary Report on Patentability for Application No. PCT/US2020/031344 (Nov. 2, 2021).
Fisher et al., "Azopyrazoles for Long-Term Thermal Energy Storage and Sub-Zero Optically Triggered Heat Release," Poster presented on Feb. 4, 2020.
Calbo et al., "Tuning Azoheteroarene Photoswitch Performance Through Heteroaryl Design," Journal of the American Chemical Society 139:1261-1274 (2017).
Chu et al., "Light-Responsive Arylazopyrazole Gelators: From Organic to Aqueous Media and from Supramolecular to Dynamic Covalent Chemistry," Chemistry European Journal 25:6131-6140 (2019).
Gerkman et al., "Phase Transition of Spiropyrans: Impact of Isomerization Dynamics at High Temperatures," Chem. Commun. 41(55):5813-5816 (2019).
Wang et al., "Supramolecular Hydrogels Constructed by Red-Light-Responsive Host-Guest Interactions for Photo-Controlled Protein Release in Deep Tissue," Soft Matter 11:7656-7662 (2015).
Gonzalez et al., "Solid-State Photoswitching Molecules: Structural Design for Isomerization in Condensed Phase," Materials Today Advances 6:100058 (2020).

* cited by examiner benzo[b]thiophene (1) 2-dodecylbenzo[b]thiophene (2) 3-bromo-2-dodecylbenzol[b]thiophene octafluorocyclopentene $R=C_{12}H_{25}$ (3) 1,2,-Bis(2-dodecyl-1-benzothiophen-3yl)perfluorocyclopentene

THERMAL STORAGE MATERIALS AND APPLICATIONS THEREOF

This application is a national stage application under 35 U.S.C. § 371 of PCT Application No. PCT/US2020/031344, filed May 4, 2020, which claims the priority benefit of U.S. Provisional Patent Application Ser. No. 62/843,136, filed May 3, 2019, which is hereby incorporated by reference in its entirety.

FIELD OF THE INVENTION

The present invention relates to compositions and automotive products, as well as uses thereof, which can facilitate warming of engine oil in an energy efficient and, therefore, more environmentally friendly manner.

BACKGROUND OF THE INVENTION

In areas where temperatures often drop below −20° C. (−4° F.), such as the northern US and Canada, cars have trouble starting up. When a car starts, the engine pumps oil through the engine block lubricating the moving parts. At temperatures below 0° C., the oil is thicker and denser than usual (density of oil is 0.9393 g/cm3 at 20° C. and rises to 0.9582 g/cm3 at −10° C.) (Griffin, H. K. "Density of a Lubricating Oil at Temperatures from −40 to +20° C." *Ind. Eng. Chem.* 17:1157-1158 (1925)) and increases friction wearing down the engine parts. In fact, the majority of damage in engine components occurs during a cold start (Nautiyal et al., "Cold Start Wear Performance in Methanol and Gasoline Engines," *SAE Technical Paper,* 850215 (1985)).

The desire to avoid engine damage and improve longevity of a vehicle created the market for oil heating devices that warm up the oil pan in an engine using electricity. These devices take commonly two forms: dipstick heaters, which are put in place of the drain plug in the oil pan, and heating pads which are glued directly to the bottom of the oil pan. Despite the widespread use, these devices have several drawbacks. Users plug their car in for hours to fully heat the oil pan, making the immediate use of engine difficult. A standard 300 W oil pan heater is usually left on overnight and consumes 2.7 kWh of electricity. Over a typical winter, this translates to ~300 kWh (or more) per winter per car.

Currently, there is no commercial device that can quickly heat up engine oil, and there is no energy-efficient option to do so.

The present invention is directed to overcoming these and other deficiencies in the art.

SUMMARY OF THE INVENTION

The first aspect of the present application relates to a fluid reservoir including a double walled vessel that defines a fluid containing compartment. The double walled vessel has a self-contained region that shares a wall with the fluid containing compartment, and a composition that at least partially covers the wall surface in the self-contained region, as well as one or more light sources positioned in the self-contained region. The composition comprises an optically-inducible heat storage composition.

A second aspect of the present application relates to a method for warming oil in an oil pan reservoir including providing an oil pan with fluid reservoir according to the first aspect of the application, that contains warm oil. Then allowing the warm oil to transfer heat through the shared wall to the composition in the self-contained region, whereby the composition undergoes a phase transition and stores energy. Then illuminating the composition using the one or more light sources to induce a second phase transition of the composition, whereby energy is transferred through the shared wall from the composition to oil in the oil pan to warm the oil.

A third aspect of the present application relates to a method of starting a vehicle engine in extreme cold environments, the method includes providing a vehicle with an oil pan including fluid reservoir according the first aspect of the present application, where the composition is in a phase transition state that has retained stored energy. Then, illuminating the composition using the one or more light sources to induce a phase transition of the composition, whereby energy is transferred through the shared wall from the composition to oil in the oil pan to warm the oil; and starting the engine.

A fourth aspect of the present application relates to light-responsive, photo-switching molecules and optically-inducible heat storage compositions.

The present invention affords an energy-efficient alternative to the energy-inefficient block heaters currently in use. This is achieved using optically-inducible heat storage compositions, which can be either (i) a light-responsive, photo-switching molecule; or (ii) a composite containing a phase-change material (PCM) and a light-responsive, photo-switching molecule. These optically-inducible heat storage compositions absorb waste heat generated from a running engine, store the heat (e.g., overnight), and release the heat on demand to warm up the engine oil once triggered by an light source, preferably LEDs, whose output wavelength is sufficient to induce the photo-switching molecule. In a double-walled oil-pan of the present invention, the product is expected to provide an instant source of heat (~200-300 J/g) at almost zero cost by recycling the heat generated from a running engine. Beyond the LEDs operated by the vehicle battery for a short periods of time, no external power source is required to induce heat release. From the end-user's perspective, the product will pay for itself in saved electricity consumption over the life of the vehicle.

The same principle can be used for water heating systems. A water heater installed near a rooftop can absorb excess solar heat during daytime, stored in the optically-inducible heat storage compositions, and then the heat can be released after sundown to generate hot water without operating gas-fueled boilers for a period of time or, at a minimum, reducing gas consumption while maintaining hot water temperature.

BRIEF DESCRIPTION OF THE DRAWINGS

FIG. 5A shows an exemplary synthetic scheme for the formation of a representative spiropyran derivative, (R)-2-(3',3'-dimethyl-6-nitrospiro[chromene-2,2'-indolin]-1'-yl)ethyl tridecanoate. The same synthesis scheme can be used to prepare structurally similar spiropyrans bearing an alkyl alkanoate sidechain. FIG. 5B is a plot of the differential scanning calorimetry (DSC) thermal analysis of (R)-2-(3',3'-dimethyl-6-nitrospiro[chromene-2,2'-indolin]-1'-yl)ethyl tridecanoate.

DETAILED DESCRIPTION OF THE INVENTION

One aspect of the present application relates to a device that utilizes an optically-inducible heat storage composition to warm fluids stored in an adjacent compartment.

In one embodiment, the device takes the form of a fluid reservoir including a double walled vessel that defines a fluid containing compartment. The double walled vessel has a self-contained region that shares a wall with the fluid containing compartment, and a composition that at least partially covers the wall surface in the self-contained region, as well as one or more light sources positioned in the self-contained region. The composition is an optically-inducible heat storage composition.

Figure 1B:
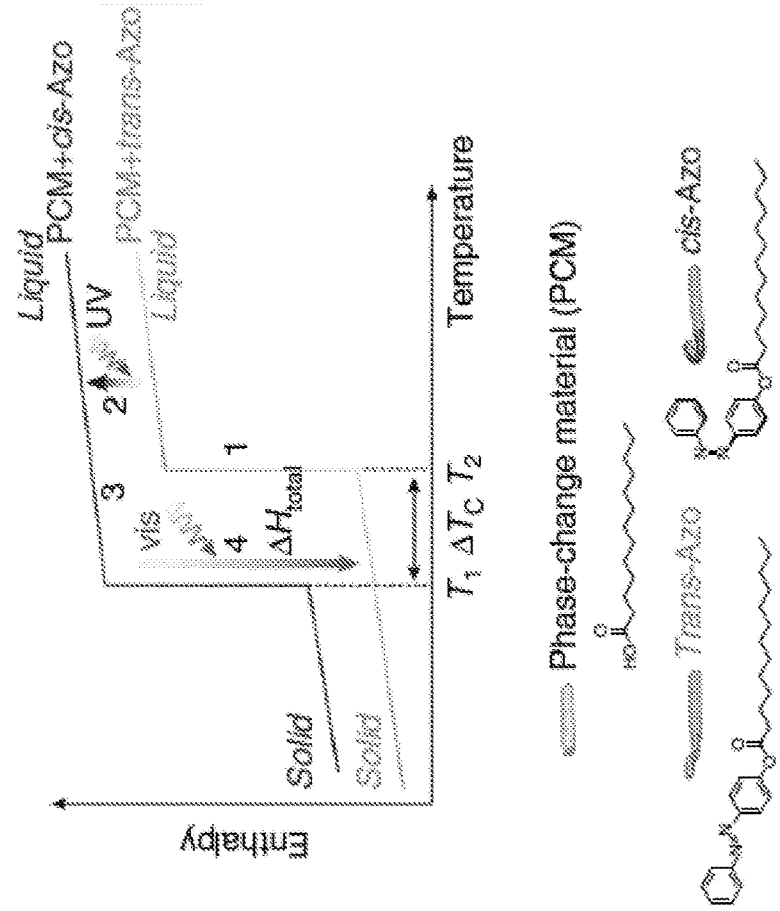
FIG. 1B is a graphical representation of the phase transitions and energy input for the inventive compositions. As shown, an exemplary fatty acid, tridecanoic acid, is shown as the phase change material, and exemplary azobenzene isomers, (E)-4-(phenyldiazenyl)phenyl tridecanoate and (Z)-4-(phenyldiazenyl)phenyl tridecanoate, are shown as the photo-switching molecule. This represents a non-limiting example of an optically-inducible heat storage composition.
Figure 1A:
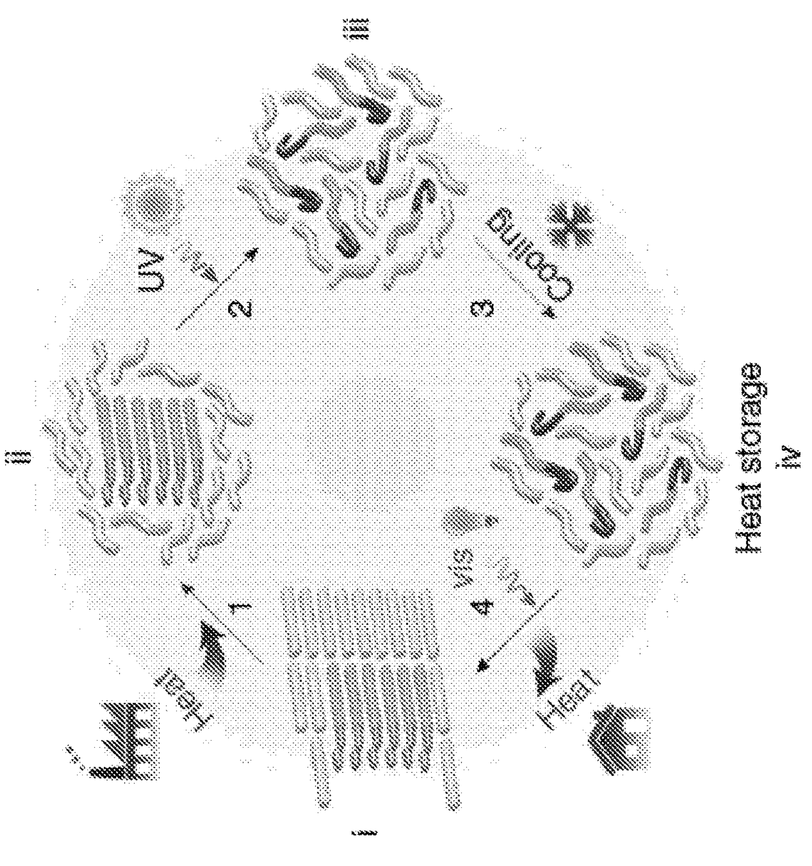
FIG. 1A is a schematic illustration of an exemplary optically-inducible heat storage composition, which shows the phase transitions and energy input a composite containing a phase-change material (PCM) and a light-responsive, photo-switching molecule.

According to one approach the optically inducible heat storage material can take the form of (i) a substantially pure, light-responsive, photo-switching molecule; or (ii) a composite containing a phase-change material (PCM) and a light-responsive, photo-switching molecule. Regardless of the specific optically inducible heat storage material, these materials allow for thermal energy storage through melting (latent heat storage), which is then able to be released by crystallization. Use of the photo-switching component (as the molecular switch material) enables optical control of this otherwise passive process, as shown in FIGS. 1A-B. Examples of photo-switching molecules and phase-change material (PCM) are discussed below.

A PCM is latent thermal storage material using chemical bonds to store and release heat. These materials are capable of absorbing and releasing high amounts of latent heat during melting and crystallization, respectively.

Phase change materials for use in the present application include alkanes, fatty acids, fatty alcohols, fatty acid esters, paraffin waxes, polyethylene glycols, sugar alcohols, salts of fatty acid, and combinations thereof. They can have an origin derived from animal fat, animal grease, vegetable oil, vegetable wax, synthetic compounds and/or combinations of two or more thereof. Due to phenomena described by freezing point depression theory, mixtures generally tend to release latent heat over a larger temperature range than pure components. Whereas pure components are often referred to as having a melting point temperature, mixtures typically have a melting point temperature range.

In certain embodiments, the phase change material is selected from the group consisting of fatty acids, fatty acid esters, fatty alcohols, and combinations thereof.

The fatty acid and fatty alcohol phase change materials can have a C8 to C30 hydrocarbon chain, preferably those having a C14 to C30 hydrocarbon chain. The hydrocarbon chain can be saturated or unsaturated, although it is preferably saturated. In one embodiment, the composition includes a fatty acid or fatty alcohol as the phase change material.

Suitable fatty acids include those occurring naturally in triglycerides as well as synthetic fatty acids. Fatty acids can be obtained from the hydrolysis of triglycerides, as is well known in the art. Exemplary fatty acids for use in the preset application include, but are not limited to oleic acid, palmitic acid, linoleic acid, palmitoleic acid, stearic acid, tridecanoic acid, pentadecanoic acid, heptadecanoic acid, nonadecanoic acid, caprylic acid, capric acid, and lauric acid as well as combinations of two or more thereof. Frequently available fatty acids can be hydrates and hydrogenated acids of any of the preceding acids.

The fatty acid esters can be formed with alcohols, diols, and/or polyols, including, but not limited to, mono-, di- or triglycerides of glycerol, esters of pentaerythritol, polyesters of polyhydric alcohols, esters of methanol, ethanol, propanol, butanol, isobutanol, pentanol, hexanol, cyclohexanol, esters or diesters of ethylene glycol and/or combinations of two or more thereof. The fatty acid esters can be mono-, di- or triglycerides of glycerol, and/or combinations thereof. Additionally, the fatty acid esters can be ester of higher fatty acids with higher monohydric alcohols.

Esters of fatty acids can be formed by a variety of methods known in the art including transesterification or hydrolysis followed by esterification. The advantage of this approach is that relatively pure components having targeted melting point temperatures can be synthesized.

For example, a multitude of esters of oleic acid can be formed by complete esterification with methanol, ethanol, propanol, butanol, isobutanol, pentanol, hexanol, cyclohexanol, phenol, ethylene glycol, glycerin, diethylene glycol, and many more. To a first approximation, the oleate esters formed with each of these esters will result in different melting point temperatures. Furthermore, mixtures of two of the esters have the potential to form mixtures having relatively narrow and useful melting point temperature ranges.

Exemplary fatty alcohols for use as PCMs include, but are not limited to, dodecanol (lauryl alcohol), tetradecanol (myristyl alcohol), hexadecanol (cetyl alcohol), and octadecanol (stearyl alcohol).

In another embodiment, the phase change material is a long chain alkanes or alkene with minimal branching, or no branching; of these, long chain alkanes with minimal branching are preferred. These hydrocarbons are able to solidify at temperatures above 0° C., and can absorb heat and melt. Alkanes ranging in carbon length from C14 to C30 may be particularly useful in the present application. Exemplary alkane PCMs of the present application include, but are not limited to long chain aliphatic such as tetradecane, pentadecane, hexadecane, heptadecane, octadecane, nonadecane, icosane, henicosane, docosane, tricosane, tetracosane, pentacosane, hexacosane, heptacosane, octacosane, nonacosane, icosane, and triacontane.

Additionally, natural and synthetic polymers may be use for phase change materials in the present application. Exemplary polymers include, but are not limited to polyethylene glycol, polypropylene glycol, polytetramethylene glycol, Poly(N-isopropyl acrylamide), Poly(diethyl acrylamide), Poly(tert-butylacrylate), Poly(isopropyl methacrylamide), Hydroxypropyl cellulose, Hydroxymethyl cellulose, Poly (oxazoline), and Poly(organophosphazenes).

A sugar alcohol (also known as a polyol, polyhydric alcohol, or polyalcohol) is a hydrogenated form of a saccharide, whose carbonyl group (aldehyde or ketone, reducing sugar) has been reduced to a primary or secondary hydroxyl group. They are commonly used for replacing sucrose in foodstuffs, often in combination with high intensity artificial sweeteners to counter the low sweetness. Exemplary sugar alcohols that may be used in the present application as PCMs include, but are not limited to, xylitol, pentaerythrite, trimethylolethane, erythrite, mannitol, neopentyl glycol and mixtures thereof.

Further examples of phase change materials that can may be used in the present application are disclosed in U.S. Pat. No. 6,574,971 to Suppes; and U.S. Pat. No. 8,308,861 to Rolland et al.; U.S. Pat. No. 7,645,803 to Tamarkin et al.; and U.S. Patent Application Publication No. 2019/0092992 to Raj agopalan et al., all of which are hereby incorporated by reference in their entirety.

Due to the activity of the photo-switching component, the photo-switchable phase change materials have a ground state (OFF state) that is a crystalline solid. When the phase change material is molten, irradiation (using light of appropriate wavelength) changes the switch to a metastable state (ON state) and "locks" the liquid phase. The step of irradiation can be carried out for a period of time sufficient to lock the liquid phase in the metastable state; typically this is from several minutes to several hours depending on the photo-switching component. The stabilized liquid phase can then be stored for a desired period of time and allowed to cool to ambient temperature. For the release, irradiation induces crystallization by changing the switch back to its ground state (i.e., turning off the switch).

In certain limited exceptions, irradiation of the optically-inducible heat storage composition to "lock" the liquid phase in the metastable state can omitted, because the photo-switching component inherently causes the optically-inducible heat storage composition to adopt the metastable state once it is sufficiently heated. One such example is the photo-switching component (E)-1-methyl-4-(phenyldiazenyl)-1H-pyrazole, which can be melted without any initial irradiation and then optically triggered to crystalize as (Z)-1-methyl-4-(phenyldiazenyl)-1H-pyrazole.

Organic photoswitches that undergo reversible changes upon light irradiation have been integrated into various materials for applications, including light-driven actuation, drug delivery, sensing, and optical memory (Han et al., "Optically-controlled Long-term Storage and Release of Thermal Energy in Phase-change Materials," *Nature Communications* 8: 1446 (2017), which is hereby incorporated by reference in its entirety).

Any suitable photo-switching component can be used alone or in combination with the phase-change material(s) to trigger exothermic phase change can be incorporated into the devices of the present invention, whether the photo-switching component is one that was previously known or is later-developed. Exemplary classes of photo-switching components suitable for use in the present invention include, but are not limited to, azobenzenes, arylazopyrroles, arylazopyrazoles, diarylethenes, and spiropyrans. Particularly preferred are azobenzene, arylazopyrrole, arylazopyrazole, diarylethene, and spiropyran derivatives that include a substituent bearing a saturated or unsaturated hydrocarbon chain that is compatible (i.e., miscible) with the phase change material as described above.

In certain embodiments of the present invention, the photo-switching component is the reaction product of an azobenzene and a fatty acid or fatty alcohol. Azobenzenes functionalized with hydrocarbon chains allow for high miscibility with the phase change materials. See Han et al., "Optically-controlled Long-term Storage and Release of Thermal Energy in Phase-change Materials," *Nature Communications* 8: 1446 (2017), which is hereby incorporated by reference in its entirety. Azobenzene-based compounds are capable of reversible photoisomerization. Azobenzenes exhibit rapid and reversible trans-cis photoisomerization upon irradiation with UV or visible light. The large structural and dipole moment change associated with this isomerization also causes significant optical and surface property changes. Exemplary azobenzenes for use in the present application include azobenzenes with substitution at the para-position of the azobenzene core to alter the intermolecular interactions in the resulting composites.

Halide-functionalized (F, Cl, Br, I) azobenzenes are have a potential for use in optically-switchable heat storage and release. The ground state is crystalline solid, and the metastable state is liquid. Synthetic procedures for such compounds are reported in Lv et al., "Photocatalyzed Oxidative Dehydrogenation of Hydrazobenzenesto Azobenzenes," *Green Chem.* 21(15):4055-4061 (2019), which is hereby incorporated by reference in its entirety. Additional synthetic procedures for ortho-fluoridated azobenzenes are described in Bléger et al., *J. Am. Chem. Soc.* 134:20597-20600 (2012), which is hereby incorporated by reference in its entirety, including the following compounds 2,2',6,6'-tetrafluoroazobenzene, 2,2',6,6'-tetrafluoro-4,4'-diacetamidoazobenzene, and diethyl-4,4'-(2,2',6,6'-tetrafluoro)azobenzene dicarboxylate. Variants of these azobenzenes with longer alkyl or alkoxy sidechains can be prepared, and are expected to exhibit effective nucleation.

Figure 2:
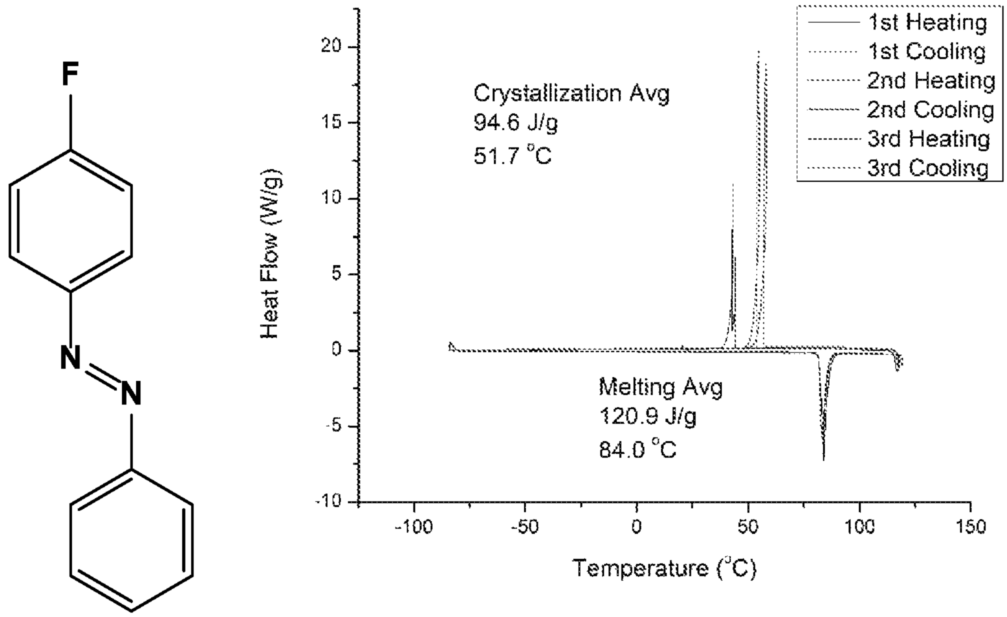
FIG. 2 is a plot of the differential scanning calorimetry (DSC) thermal analysis of p-fluoro-azobenzene.
Figure 3A:
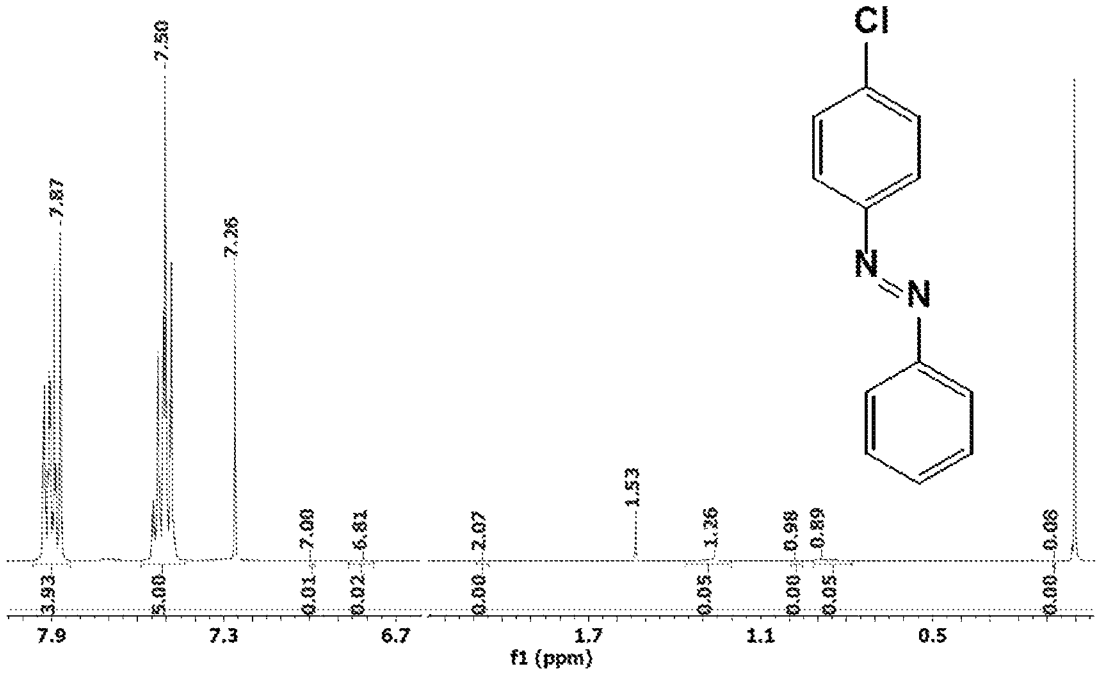
FIGS. 3A-3B are proton NMR spectra of p-chloro-azobenzene (FIG. 3A) and p-fluoro-azobenzene (FIG. 3B) compounds.
Figure 3B:
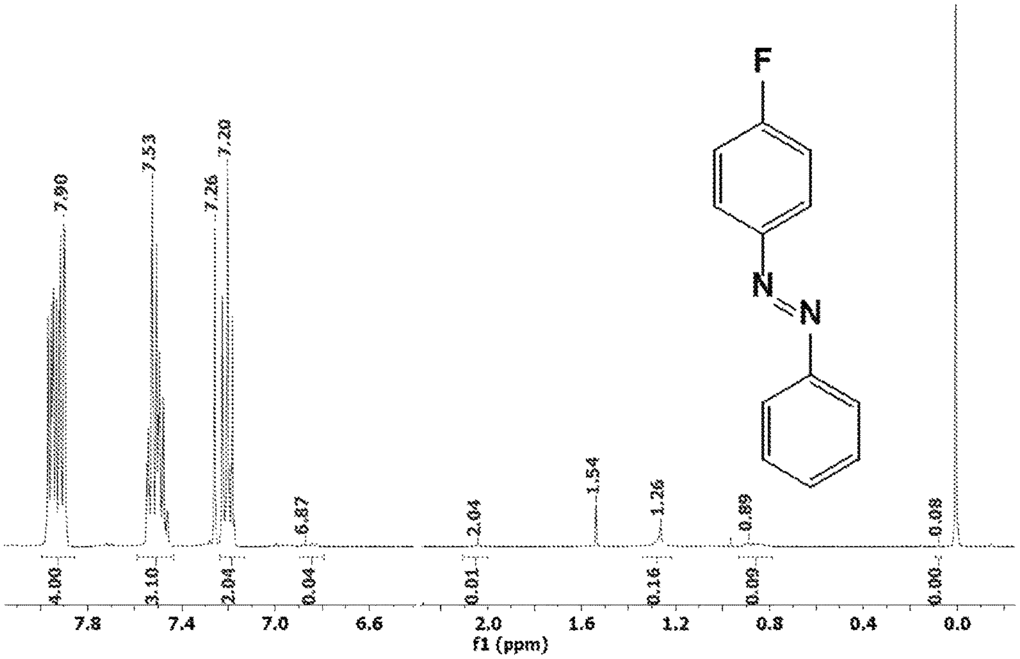

In p-chloro-azobenzene the trans isomer is considered OFF and the cis is the ON isomer. Interconversion is achieved by irradiation at 340 nm (yield of 95%). The trans isomer has a melting point at 88° C., and a crystallization point at 59° C. The cis isomer has a melting point at 45° C., shows no crystallization down to −90° C., and cold-crystallization at 0° C. Upon visible-light triggered crystallization, a total energy of 300 J/g is expected to be released, and little thermal decomposition is noticed. P-fluoro-azobenzene trans isomer has a melting point at 84° C., and a crystallization point at 54° C. (FIG. 2) (similar in characteristic to p-chloro-azobenzene). FIGS. 3A-3B show the NMR spectra of the p-chloro-azobenzene and the p-fluoro-azobenzene compounds, respectively.

In one embodiment of the present application, the azobenzene is of formula (I)

(I)

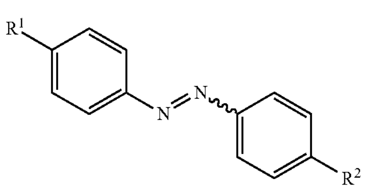

wherein $R^1$ and $R^2$ are independently H, a halogen, saturated or unsaturated $C_1$-$C_{20}$ alkyl (preferably $C_{10}$-$C_{20}$ alkyl), —$OR^3$, —$OC(O)R^3$;

$R^3$ is a H, or a saturated or unsaturated $C_1$-$C_{20}$ alkyl (preferably $C_{10}$-$C_{20}$ alkyl); and at least one of $R^1$, $R^2$, or $R^3$ is $C_1$-$C_{20}$ alkyl, preferably $C_{10}$-$C_{20}$ alkyl.

One exemplary azobenzene derivative of formula (I) is 4-(phenyldiazenyl)phenyl tridecanoate, which has the following structure:

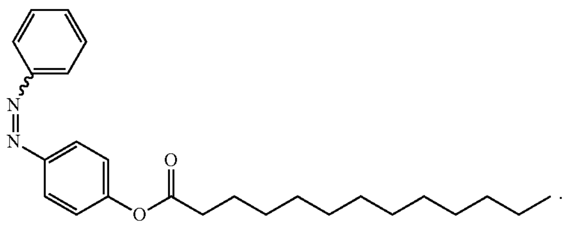 [SMILES: CCCCCCCCCCCCC(=O)Oc1ccc(N=Nc2ccccc2)cc1]

In another embodiment of the present invention, the photo-switching component is an arylazopyrrole or arylazopyrazole bearing a hydrocarbon chain. In some embodiments, the photo-switching component is the reaction product of an arylazopyrrole or arylazopyrazole and a fatty acid or fatty alcohol. In some examples, arylazopyrazoles have been shown to store and release heat at ~30° C.

Exemplary arylazopyrroles and arylazopyrazoles that can be modified by replacement of an alkyl component with $C_1$-$C_{20}$ alkyl, alkoxy, or alkyl-ester group include, but are not limited to, (E)-1-methyl-2-(phenyldiazenyl)-1H-pyrrole, (E)-3,5-dimethyl-2-(phenyldiazenyl)-1H-pyrrole, (E)-1,3,5-trimethyl-2-(phenyldiazenyl)-1H-pyrrole, (E)-1-methyl-4-(phenyldiazenyl)-1H-pyrazole, and (E)-1,3,5-trimethyl-4-(phenyldiazenyl)-1H-pyrazole as described by Weston et al., "Arylazopyrazoles: Azoheteroarene Photoswitches Offering Quantitative Isomerization and Long Thermal Half-Lives," *J. Am. Chem. Soc.* 136(34):11878-11881 (2014), which is hereby incorporated by reference in its entirety; (E)-3,5-Dimethyl-4-(phenyldiazenyl)-1H-pyrazole, (E)-3,5-Dimethyl-4-(p-tolyldiazenyl)-1H-pyrazole, (E)-3,5-Dimethyl-4-(m-tolyldiazenyl)-1H-pyrazole, (E)-3,5-Dimethyl-4-(o-tolyldiazenyl)-1H-pyrazole, (E)-3,5-Diethyl-4-(phenyldiazenyl)-1H-pyrazole, (E)-4-((3,5-Dimethylphenyl)diazenyl)-3,5-dimethyl-1H-pyrazole, (E)-4-(Mesityldiazenyl)-3,5-dimethyl-1H-pyrazole, (E)-4-((4-Isopropylphenyl)diazenyl)-3,5-dimethyl-1H-pyrazole, (E)-4-((4-(tert-Butyl)phenyl)diazenyl)-3,5-dimethyl-1H-pyrazole, (E)-3,5-Dimethyl-4-(naphthalen-2-yldiazenyl)-1H-pyrazole, (E)-4-((4-Methoxyphenyl)diazenyl)-3,5-dimethyl-1H-pyrazole, (E)-4-((4-Isopropoxyphenyl)diazenyl)-3,5-dimethyl-1H-pyrazole, (E)-3-((3,5-Dimethyl-1H-pyrazol-4-yl)diazenyl)pyridine, (E)-3,5-Dimethyl-4-((4-(trifluoromethoxy)phenyl)diazenyl)-1H-pyrazole, (E)-3,5-Dimethyl-4-((4-(trifluoromethyl)phenyl)diazenyl)-1H-pyrazole, (E)-4-((3,5-Dimethyl-1H-pyrazol-4-yl)diazenyl)benzonitrile, (E)-3,5-Dimethyl-4-((3-nitrophenyl)diazenyl)-1H-pyrazole, and (E)-3,5-Dimethyl-4-((4-nitrophenyl)diazenyl)-1H-pyrazole as described by Stricker et al., "Arylazopyrazole Photoswitches in Aqueous Solution: Substituent Effects, Photophysical Properties, and Host-Guest Chemistry," *Chemistry Eur. J.* 24(34): 8639-8647 (2018), which is hereby incorporated by reference in its entirety; (E)-4-((2,6-Dimethoxyphenyl)diazenyl)-1,3,5-trimethyl-1H-pyrazole, (E)-4-((2,6-Difluorophenyl)diazenyl)-1,3,5-trimethyl-1H-pyrazole, (E)-4-((2,6-Dichlorophenyl)diazenyl)-1,3,5-trimethyl-1H-pyrazole, and (E)-4-((2,6-Difluorophenyl)diazenyl)-1-methyl-1H-pyrazole as described by Calbo et al., "A Combinatorial Approach to Improving the Performance of Azoarene Photoswitches," *Beilstein J. Org. Chem.* 15:2753-2764 (2019), which is hereby incorporated by reference in its entirety. Variants of these arylazopyrroles and arylazopyrazoles with longer alkyl, alkoxy, or alkyl-ester sidechains can be prepared, and are expected to exhibit effective nucleation.

In another embodiment of the present invention, the photo-switching component is a diarylethene bearing a hydrocarbon chain. In some embodiments, the photo-switching component is the reaction product of a diarylethene and a fatty acid or fatty alcohol.

Figure 4:
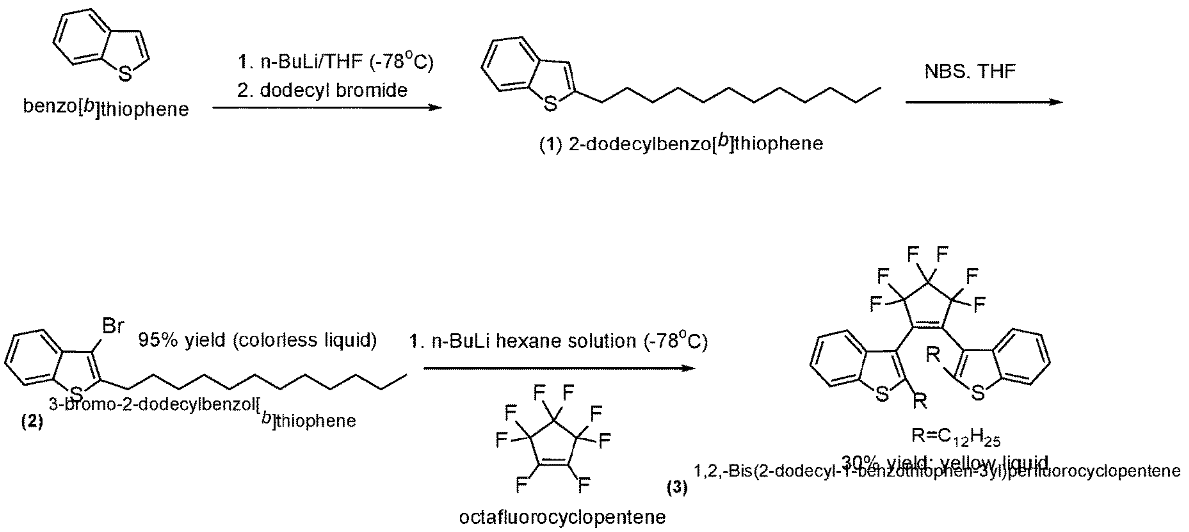
FIG. 4 is an exemplary synthetic scheme that can be used for the formation of diarylethenes having alkyl side chains, with the dodecyl group representing $C_1$ to $C_{20}$ alkyl groups.

Diarylethenes undergo structural change upon UV and visible light irradiation. By functionalizing the thiophene moiety with long alkyl chains, it is expect to see a drastic change of the phase of molecules when optically irradiated. It is expected that the ground state isomer will be a crystalline solid and the metastable isomer will be liquid. Synthesis of these materials is described in Yamaguchi et al., "Photochromism of bis(2-alkyl-1-benzothiophen-3-yl) Perfluorocyclopentene Derivatives," *Journal of Photochemistry and Photobiology A: Chemistry* 178:162-169 (2006), which is hereby incorporated by reference in its entirety. FIG. 4 shows an exemplary synthetic scheme for the formation of diarylethenes that may be used in the present application. Additional diarylethenes that may be useful in the present application are disclosed in U.S. Pat. Nos. 10,556,912 and 7,777,055 to Branda et al.; U.S. Pat. No. 7,556,844 to Iftime et al.; and Morimoto et al., "Photoswitchable Fluorescent Diarylethene Derivatives with Thiophene 1,1-Dioxide Groups: Effect of Alkyl Substituents at the Reactive Carbons," *Materials* (*Basel*) 10(9):1021 (2017); Uno et al., "Multicolour Fluorescent "Sulfide-Sulfone" Diarylethenes with High Photo-Fatigue Resistance," *Chem Commun.* 56:2198-2201 (2020), each of which is hereby incorporated by reference in its entirety.

One exemplary diarylethene that may be used in the present application is shown below:

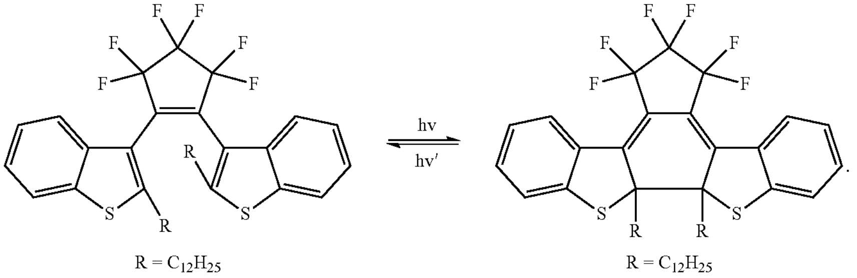

In another embodiment of the present invention, the photo-switching component is a spiropyran bearing a hydrocarbon chain. In some embodiments, the photo-switching component is the reaction product of a spiropyran and a fatty acid or fatty alcohol.

Spiropyrans exhibit an extraordinarily wide range of responsivity to photons, redox changes, and changes in temperature and pH (Kortekaas et al., "The Evolution of Spiropyran: Fundamentals and Progress of an Extraordinarily Versatile Photochrome," *Chem. Soc. Rev.* 48: 3406 (2019), which is hereby incorporated by reference in its entirety). The structural formula of the closed-ring isomer of spiropyran comprises an indoline and a chromene moiety bound together via a spiro junction and oriented perpendicular with respect to one another (Klajn, R., "Spiropyran-based dynamic materials" *Chem. Soc. Rev.,* 243:148-184 (2014), which is hereby incorporated by reference in its entirety). UV irradiation of the closed ring spiropyran gives rise to the open-ring isomer.

In one embodiment of the present application, the spiropyran is of formula (II)

(II)

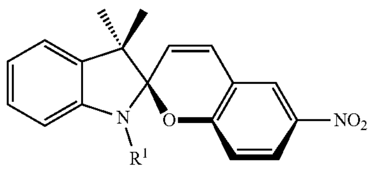

wherein $R^1$ is saturated or unsaturated $C_1$-$C_{20}$ alkyl (preferably $C_{10}$-$C_{20}$ alkyl), $—(CH_2)_n—OR^2$, or $—(CH_2)_n—OC(O)R^2$ where n is 1 to 10 and $R^2$ is saturated or unsaturated $C_1$-$C_{20}$ alkyl (preferably $C_{10}$-$C_{20}$ alkyl).

Exemplary spypropyrans that can be modified by replacement of an alkyl component with $C_1$-$C_{20}$ alkyl, alkoxy, or alkyl-ester group include, but are not limited to, include, but are not limited to, 3-(2-(2-hydroxystyryl)-3,3-dimethyl-3H-indol-1-ium-1-yl)propane-1-sulfonate, 1',3',3'-trimethyl-spiro[chromene-2,2'-indoline], 1',3',3'-trimethyl-6-nitro-spiro[chromene-2,2'-indoline], 1',3',3',8-tetramethylspiro [chromene-2,2'-indoline], as described by Samanta et al., "Reversible Chromism of Spiropyran in the Cavity of a Flexible Coordination Cage," *Nature Communications* 9: 641 (2018), which is hereby incorporated by reference in its entirety; 3',3'-Dimethyl-6-nitro-Spiro[2H-1-benzopyran-2, 2'-[2H]indole]-1'(3'H)-propanol, 3',3'-Dimethyl-Spiro[2H-1-benzopyran-2,2'-[2H]indole]-1'(3'H)-propanol, 3',3'-Dimethyl-6-chloro-Spiro[2H-1-benzopyran-2,2'-[2H]indole]-1'(3'H)-propanol, 3',3'-Dimethyl-6-methoxy-Spiro[2H-1-benzopyran-2,2'-[2H]indole]-1'(3'H)-propanol, 3',3'-Dimethyl-6,8-dibromo-Spiro[2H-1-benzopyran-2,2'-[2H] indole]-1'(3'H)-propanol, 3',3'-Dimethyl-6-ethynyl-Spiro [2H-1-benzopyran-2,2'-[2H]indole]-1'(3'H)-propanol, 3',3'-Dimethyl-6-ethynyl-8-methoxy-Spiro[2H-1-benzopyran-2, 2'-[2H]indole]-1'(3'H)-propanol, 3',3'-Dimethyl-6-bromo-Spiro[2H-1-benzopyran-2,2'-[2H]indole]-1'(3'H)-propanol, 3',3'-Dimethyl-8-methoxy-6-nitro-Spiro[2H-1-benzopyran-2,2'-[2H]indole]-1'(3'H)-propanol, 3',3'-Dimethyl-6-bromo-8-methoxy-Spiro[2H-1-benzopyran-2,2'-[2H]indole]-1'(3'H)-propanol, 3',3'-Dimethyl-7-methoxy-Spiro[2H-1-benzopyran-2,2'-[2H]indole]-1'(3'H)-propanol, 1'-(3-Iodopropyl)-1',3'-dihydro-3',3'-dimethyl-6-nitro-Spiro[2H-1-benzopyran2,2'-[2H]indole], 1'-(3-Iodopropyl)-1',3'-dihydro-3',3'-dimethyl-6-chloro-Spiro-[2H-1-benzopyran-2, 2'[2H]indole], 1'-(3-Iodopropyl)-1',3'-dihydro-3',3'-dimethyl-6,8-dibromo-Spiro[2H-1-benzopyran-2,2' [2H] indole], 1'-(3-Iodopropyl)-1',3'-dihydro-3',3'-dimethyl-6-bromo-8-methoxy-Spiro[2H-1-benzopyran-2,2'-[2H] indole], 1'-(3-Iodopropyl)-1',3'-dihydro-3',3'-dimethyl-6-nitro-8-methoxy-Spiro[2H-1-benzopyran-2,2'-[2H]indole], 1'-(3-Iodopropyl)-1',3'-dihydro-3',3'-dimethyl-6-ethynyl-Spiro[2H-1-benzopyran-2,2'-[2H]indole], 1'-(3-Iodopropyl)-1',3'-dihydro-3'.3'-dimethyl-spiro[3H]naphth[2,1-b][1, 4]oxazine, 1'-(3-Azidopropyl)-1',3'-dihydro-3',3'-dimethyl-6-nitro-Spiro[2H-1-benzopyran2,2'[2H]indole], 1-(1',3'-dihydro-3'3'-dimethyl-6-nitro-spiro[2H-1-benzopyran-2,2' [2H]indole]-1'-propyl-1H-[1,2,3]triazol-4-yl)-pyrene, as described by Beyer et al., "Synthesis of Spiropyrans As Building Blocks for Molecular Switches and Dyads," *J. Org. Chem.* 75(8):2752-2755 (2010), which is hereby incorporated by reference in its entirety. Variants of these spiropyrans with longer alkyl, alkoxy, or alkyl-ester sidechains can be prepared, and are expected to exhibit effective nucleation.

The phase change of common spiropyran derivatives has been studied previously (Gerkman et al., "Phase Transition of Spiropyrans: Impact of Isomerization Dynamics at High Temperatures," *Chem. Commun.* 55:5813-5816 (2019), which is hereby incorporated by reference in its entirety), but no photo-induced nucleation is described therein. It is expected that granting higher mobility to the molecules will facilitate photo-induced phase change and installing long alkyl chains will afford effective nucleation.

Figure 5A:
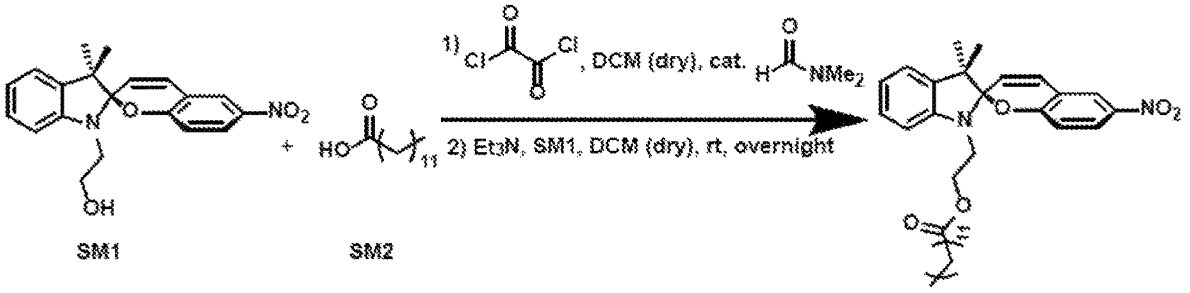
FIGS. 5A-5B relate to the spiropyran derivatives which can be used as the molecular switch material.
Figure 5B:
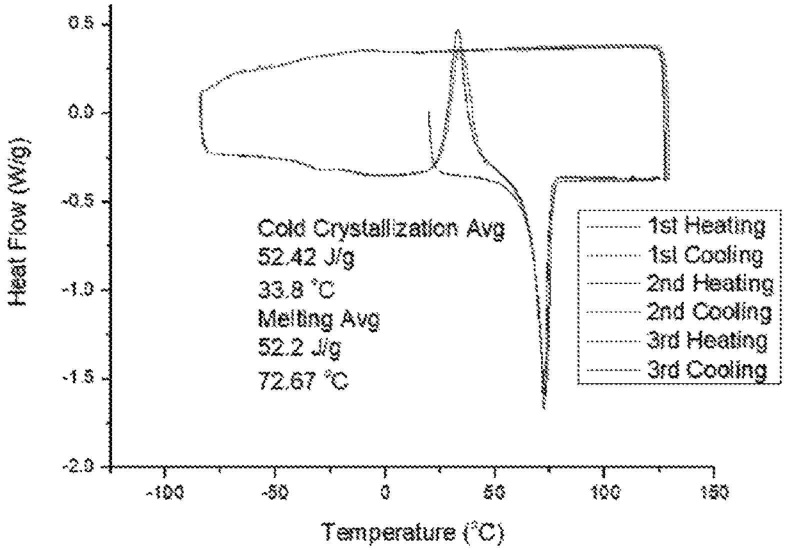

A new spiropyran synthesis has been accomplished, attaching a long carbon ester chain to the indoline nitrogen. FIG. 5A shows an exemplary synthetic scheme for the formation of (R)-2-(3',3'-dimethyl-6-nitrospiro[chromene-2, 2'-indolin]-1'-yl)ethyl tridecanoate, which can be used as the photo-switching component in a composition of the invention. The thermal property measurement (FIG. 5B) indicates that this spiropyran derivative, when molten, exhibits extensive supercooling due to the increased amount merocyanine (metastable, ON switch) isomer. The liquid phase can be triggered by light to crystallize, due to the switching process (ON to OFF states). This same synthesis scheme can be used to vary the alkyl chain length from $C_8$ to $C_{20}$, which can modulate the temperature of heat storage and release.

In the optically-inducible heat storage compositions, any suitable diluent can optionally be utilized. Exemplary non-aqueous diluents include, without limitation, fatty acids, fatty acid esters, fatty alcohols, alkanes, and sugars that are not utilized as the primary phase-change material.

In the optically-inducible heat storage composition, the weight ratio of PCM component(s) to photo-switching component is from about 0:100 to about 90:10, preferably from about 0:10 to about 1:1. In embodiments where both the PCM and the photo-switching component are present, the weight ratio of PCM component(s) to photo-switching component is from about 1:100 to about 90:10, preferably from about 1:10 to about 1:1.

In one embodiment, the optically-inducible heat storage composition consists essentially of, or consists of, a photo-switching component of the type described above.

In another embodiment of the optically-inducible heat storage composition, the phase change material is selected from the group of a fatty acid or fatty alcohol, preferably having a C8 to C30 hydrocarbon chain; and the photo-switching component is 4-(phenyldiazenyl)phenyl tridecanoate. Variations of this photo-switching component bearing $C_8$ to $C_{20}$ alkyl ester groups are contemplated.

In another embodiment of the optically-inducible heat storage composition, the phase change material is selected from the group of a fatty acid or fatty alcohol, preferably having a C8 to C30 hydrocarbon chain; and the photo-switching component is (R)-2-(3',3'-dimethyl-6-nitrospiro[chromene-2,2'-indolin]-1'-yl)ethyl tridecanoate. Variations of this photo-switching component bearing $C_8$ to $C_{20}$ alkyl ester groups are contemplated.

As indicated above, one preferred device of the invention is a fluid reservoir such as a hot water tank or an oil pan.

According to one embodiment, the device of the invention relates to a fluid reservoir that includes a double-walled vessel that defines a fluid containing compartment (e.g., an oil pan designed to contain the oil of an engine or the water tank of a hot water heater), where the vessel also includes a self-contained region that shares a wall with the fluid-containing compartment. Inside the self-contained region is an optically-inducible heat storage composition, which at least partially covers the surface of the shared wall. Also provided are one or more light sources positioned in the self-contained region, whereby the light sources emit light of a suitable wavelength that is capable of inducing a phase change of, and concomitant thermal release by, the optically-inducible heat storage composition.

In certain embodiments, the optically-inducible heat storage composition substantially fills the self-contained region.

In certain embodiments, the double-walled vessel includes (i) one or more sets of heat fins that are present in the fluid containing compartment and are thermally conductive with the shared wall, (ii) one or more sets of heat fins present in the self-contained region and are thermally conductive with the shared wall, or both (i) and (ii). The heat fins can facilitate, for example, upon light-induced, exothermic phase change, the transfer of heat from the optically-inducible heat storage composition to the shared wall and then to the fluid contained inside the fluid containing compartment (such as oil in an oil pan or water in a hot water tank). To maximize heat transfer from the optically-inducible heat storage composition to the shared wall and then to the fluid contained inside the fluid containing compartment, the outer walls of the double walled vessel can be insulated.

In certain embodiments, the light sources are LEDs, which are long-lasting and energy efficient. The LEDs can be controlled by a manually triggered or variable-controlled switch and coupled to a power source (such as a car battery or a home electrical system). The number and location of the LEDs inside the self-contained region can be optimized to illuminate substantially the entire self-contained region at once or in stages. Further, it is contemplated that for some photo-switch materials, one set of LEDs can be used to lock the inventive composition in the molten (ON) state, whereas a second set of LEDs can be used to promote crystallization and heat release (OFF state).

According to one embodiment, the fluid reservoir takes the form of (rather, includes) an oil pan of a vehicle engine. In one manner of practicing the invention, the double-walled vessel can be formed by retrofitting a lower pan assembly onto a pre-existing oil pan of a vehicle. An ideal time to do so is during an oil change, after the oil pan is drained, which allows for retrofitting to form the double-walled vessel with the traditional oil pan forming the inner wall and the lower pan assembly forming the outer wall. One example of this is illustrated in FIG. 6.

Figure 6:
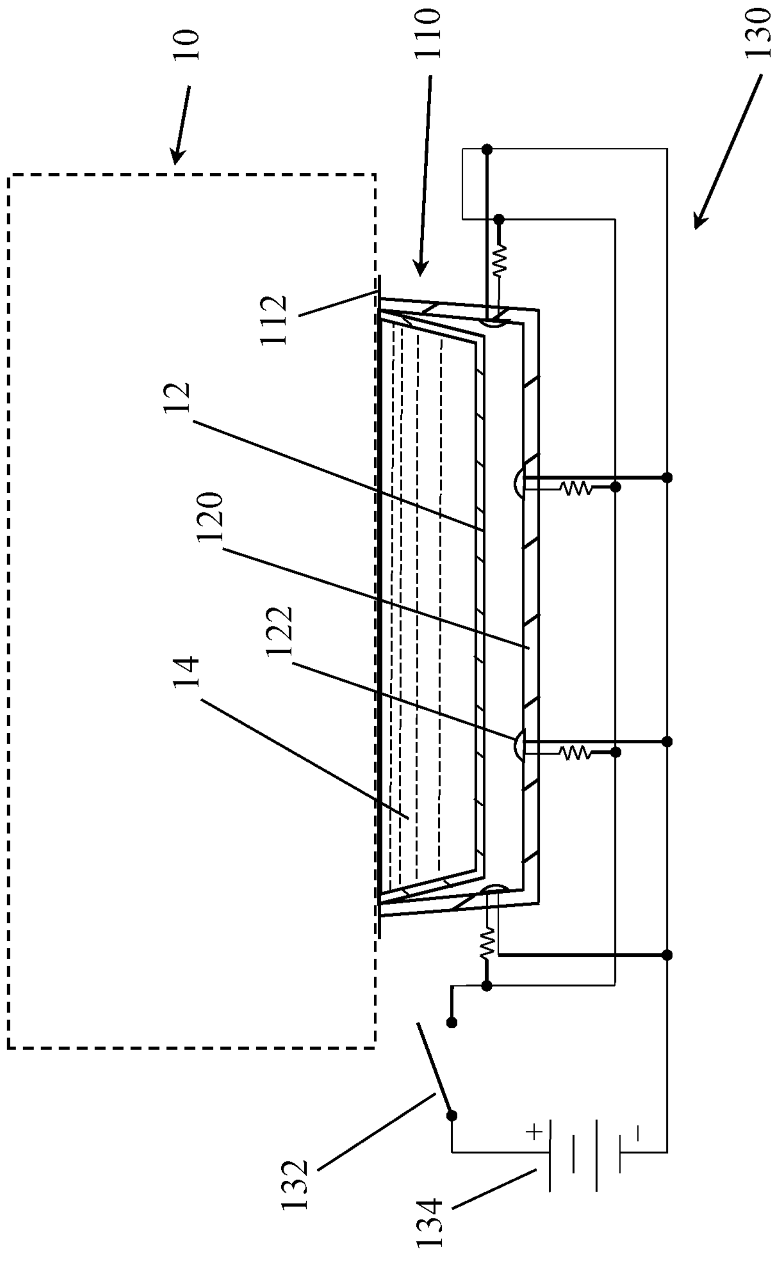
FIG. 6 is an illustration of the fluid reservoir of the present invention in the form of an oil pan coupled to a vehicle engine. The oil pan is shown to be encompassed by a lower pan which contains, in use, a composition of the invention. Also illustrated is a circuit that controls illumination of the light sources (four shown) that activate crystallization of the phase change material and concomitant heat release to the adjacent oil pan and oil contained therein.

As shown in FIG. 6, engine 10 is illustrated by dashed lines, and beneath the engine block is double walled vessel 110 formed by oil pan 12 and lower pan 120. The lower pan 120 includes a flange 112 that mates with a flange of the oil pan 12, allowing the entire vessel to be connected to the engine block using the same machine screws used to secure the oil pan to the engine block. As shown, the oil pan 12 contains a volume of oil 14. A set of LEDs 122 (four shown) are installed in the wall of lower pan 120. The LEDs 122 are connected to an electrical circuit 130 of the vehicle, which is powered by the battery 134 and controlled by switch 132.

The space between the lower pan 120 and oil pan 12 contains the optically-inducible heat storage composition. In use, the optically-inducible heat storage composition will absorb heat from the oil pan during engine use and, upon cooling, the optically-inducible heat storage composition is retained in the metastable state (ON state). The stabilized liquid phase can then be stored for a desired period of time (e.g., overnight). For the exothermic release, the LEDs 122 are illuminated upon actuation of switch 132, and the irradiation induces crystallization of the optically-inducible heat storage composition by changing the photo-switching component back to its ground state with rapid heating of the optically-inducible heat storage composition. By virtue of the oil pan being formed of, e.g., aluminum or stainless steel, heat transfer from the optically-inducible heat storage composition through the shared walls of the oil pan to the oil contained therein facilitates engine starting while minimizing engine wear.

Figure 7:
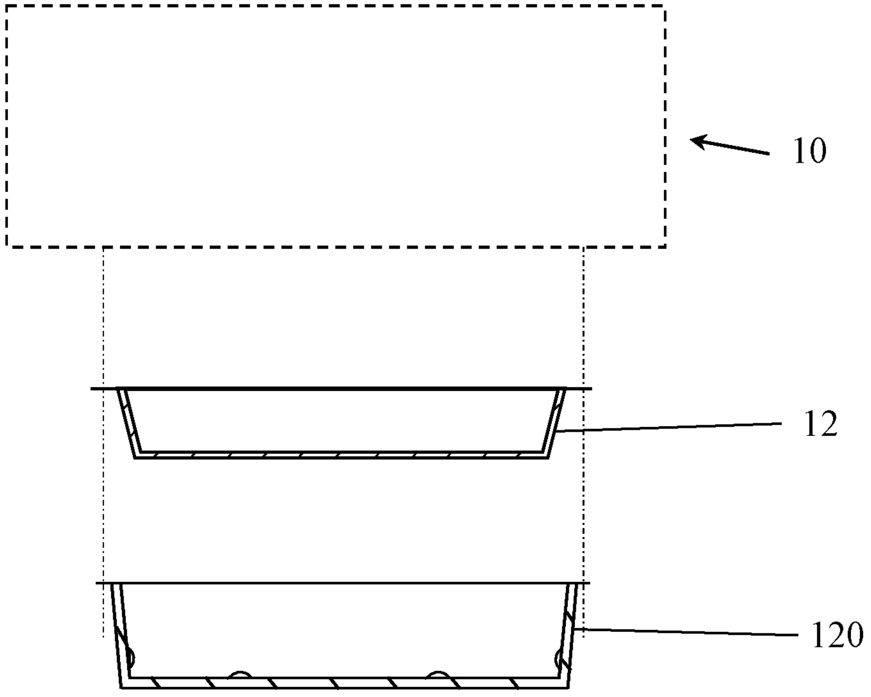
FIG. 7 is an exploded view of an engine with its original oil pan retrofitted with a lower pan intended to contain an optically-inducible heat storage composition.
Figure 8:
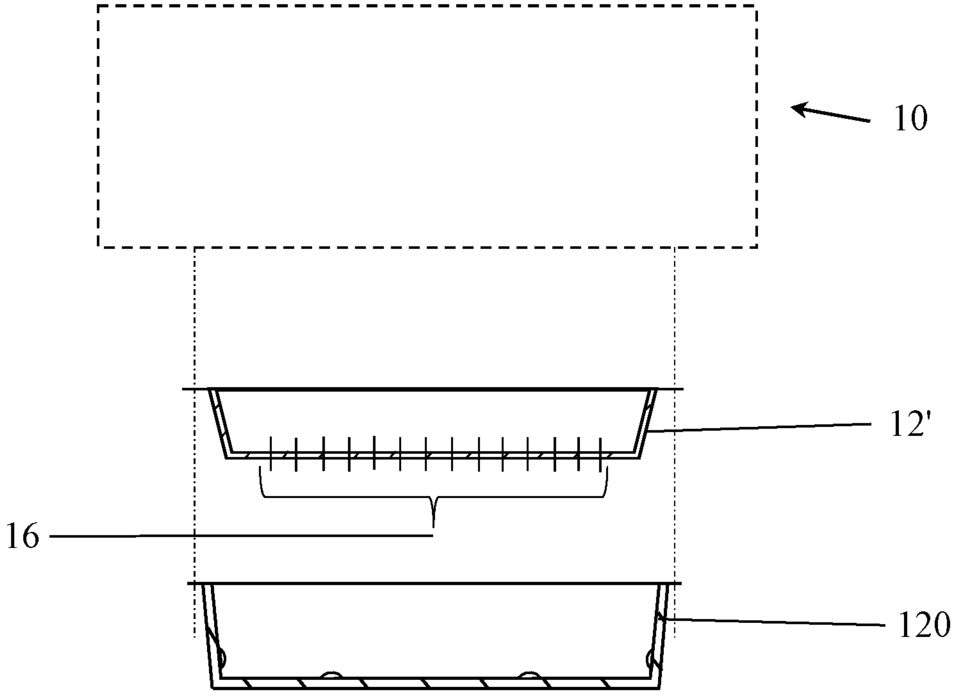
FIG. 8 is an exploded view of an engine with an oil pan intended to facilitate heat exchange between an optically-inducible heat storage composition and the oil in the oil pan.

FIG. 7 illustrates, in exploded view, how the lower pan 120 cooperates with a pre-existing aluminum or stainless steel oil pan 12. In contrast, FIG. 8 illustrates, in exploded view, how the lower pan 120 cooperates with an oil pan 12' that is configured with heat exchange fins 16 that extend upwardly into the oil pan (to contact oil) and downwardly into the lower pan (to contact the inventive composition). The heat exchange fins 16 are typically formed of aluminum, although other heat conducting metals can be used. In certain embodiments, oil pan 12' can be constructed from aluminum or stainless steel. In alternative embodiments, the oil pan 12' can be formed of heat resistant thermoplastic materials as is well known in the art. Thermoplastic materials can be molded to integrate the heat exchange fins 16 into the oil pan 12'.

The lower pan 120 can be adapted to facilitate oil changes without the need for removing the entire lower pan. For example, the lower pan 120 can be provided with an opening and collar formed around the oil pan drain port, and the collar can be sealed against the oil pan body using an M/F threaded extension pipe, whereby the male end threads in the oil pan drain port (thereby sealing the lower pan against the oil pan body while allowing oil to flow from the drain pan through the extension pipe. The female end receives a threaded drain plug as the oil pan normally would. The lower pan 120 can also be provided with a fill port and a drain port (with threaded plugs) to facilitate periodic replacement of the optically-inducible heat storage composition.

A further aspect of the present invention relates to a method for warming oil in an oil pan reservoir including providing an oil pan as part of a fluid reservoir according to the present invention, where the oil pan contains warm oil. Then allowing the warm oil to transfer heat through the shared wall to the optically-inducible heat storage composition in the self-contained region, whereby the optically-inducible heat storage composition undergoes a phase transition and stores energy. Once the oil temperature is close to ambient, and preferably below 0° C., −10° C., −20° C., −30° C., −40° C., −50° C., or −60° C., the optically-inducible heat storage composition inside the self-contained region is illuminated using the one or more light sources to induce a second phase transition of the optically-inducible heat storage composition, whereby energy is released, warming the optically-inducible heat storage composition and transferring heat through the shared wall from the optically-inducible heat storage composition to oil in the oil pan, thereby warming the oil.

The transfer of heat from the oil in the oil pan to the optically-inducible heat storage composition in the self-contained region occurs as a by-product of operating the engine (i.e., as heated oil returns to the oil pan). Once the optically-inducible heat storage composition reaches a maximum operating temperature (or an optimal threshold temperature for the specific formulation), the light source may be illuminated, if necessary, to lock the optically-inducible heat storage composition in the molten (ON) state. This can be carried out, for example, while the vehicle engine is still operating but maximum temperature is reached; or, alternatively, this can be carried out as an automated event upon shutting down the engine. Much the same way the headlamps can be programmed to stay on for a limited duration, so too can the light source for locking the optically-inducible heat storage composition in the molten state prior to cool down. Thereafter, the optically-inducible heat storage composition cools down to ambient or close to ambient temperature (following a time delay). For example, in the morning, when the engine is cold after being exposed to winter temperatures overnight, the temperature may range anywhere from 0° C. to −60° C. (or lower). Illuminating the optically-inducible heat storage composition at this point will cause phase change-induced release of heat. The heat release is transferred back to the oil through the shared oil pan wall or heat exchange fins (if present). Preferably, the heat release is sufficient to substantially warm the engine oil to facilitate engine lubrication upon start-up. In certain embodiments, the heat release is at least about 200 J/g composition, more preferably at least about 225 J/g, 250 J/g, 275 J/g, 300 J/g, or 325 J/g.

Another aspect of the present invention relates to a method of starting a vehicle engine in extreme cold environments, the method includes providing a vehicle with an oil pan including a fluid reservoir according the present application, where the optically-inducible heat storage composition is in a phase transition state that has retained stored energy. Then, illuminating the optically-inducible heat storage composition using the one or more light sources induces a phase transition of the optically-inducible heat storage composition, whereby energy is released and transferred through the shared wall from the optically-inducible heat storage composition to oil in the oil pan to warm the oil; and starting the engine.

In one embodiment, the illuminating is carried out less than 15 minutes prior to said starting the engine. In a further embodiment, the illuminating can be carried out between 1 and 10 minutes before starting the engine.

The present invention can be used in a number of alternative constructions whereby latent heat energy can be stored for future release, whereby energy consumption from a non-renewable energy source can be minimized. For example, the inventive composition can be used to supplement a natural gas or electric hot water heater. For integration into a hot water tank, a similar double walled vessel is required, wherein an outer annular compartmentalized sleeve surrounding the glass core of the water heater can contain the optically-inducible heat storage composition. Each individual compartment contains a set of LEDs, each of which is separately controlled to induce locking of the molten state (ON) and crystallization of the optically-inducible heat storage composition (OFF) by changing the photoswitching component back to its ground state with rapid heating of the optically-inducible heat storage composition. Heat transfer to the water contained inside the glass core causes warming of the water without requiring additional input from the conventional heat source (electric or natural gas). To facilitate transitioning of the optically-inducible heat storage composition into the metastable state (ON state), the optically-inducible heat storage composition inside the outer annular compartmentalized sleeve is coupled to a solar heating element to transfer heat from the solar heating element to the optically-inducible heat storage composition on a sunny day.

EXAMPLES

Example 1—Thermal Analysis of dodecyl (E)-2-(3,5-dimethyl-4-(phenyldiazenyl)-1H-pyrazol-1-yl)acetate Five milligrams of dodecyl (E)-2-(3,5-dimethyl-4-(phenyldiazenyl)-1H-pyrazol-1-yl)acetate was melted, sandwiched between two glass slides, and cooled to 50 □C. The samples were activated with UV light to the metastable liquid state and further cooled to either room temperature or −30° C. Prior to visible light-triggered crystallization, half of the sample was covered to only allow light exposure to the other half of the sample. The sample was then exposed to visible light and crystallized while releasing latent heat. The crystallization process was observed by optical microscopy, confirming only the uncovered portion of the sample had crystalized and released heat. Using differential scanning calorimetry the total heat release was quantified by the summation of the cis-to-trans isomerization energy and the enthalpy of crystallization for the trans isomer giving a total heat release of 192 J/g.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A compound of formula (I)

(I)

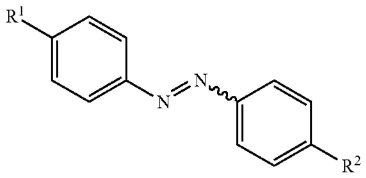

wherein $R^1$ and $R^2$ are independently H, a halogen, saturated or unsaturated $C_1$-$C_{20}$ alkyl, —$OR^3$, —$OC(O)R^3$; and $R^3$ is a H, or a saturated or unsaturated $C_1$-$C_{20}$ alkyl; and at least one of $R^1$, $R^2$, and $R^3$ is a saturated or unsaturated $C_{10}$-$C_{20}$ alkyl.

2. A composition comprising:

a molecular switch material according to claim 1; and a phase change material selected from the group of fatty acids, fatty acid esters, fatty alcohols, and combinations thereof.

3. The compound according to claim 1, wherein $R^3$ is $C_{10}$-$C_{20}$alkyl.

4. The compound according to claim 1, wherein the compound is 4-(phenyldiazenyl)phenyl tridecanoate.

5. A compound according to formula (II)

(II)

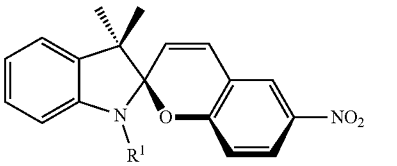

wherein $R^1$ is saturated or unsaturated $C_1$-$C_{20}$ alkyl, —$(CH_2)_n$—$OR^2$, or $(CH_2)_n$—$OC(O)R^2$ where n is 1 to 10 and $R^2$ is saturated or unsaturated $C_1$-$C_{20}$ alkyl; where where $R^1$ or $R^2$ is a saturated or unsaturated $C_{10}$-$C_{20}$alkyl.

6. A composition comprising:

a molecular switch material according to claim 5; and a phase change material selected from the group of fatty acids, fatty acid esters, fatty alcohols, and combinations thereof.

7. The compound according to claim 5, where $R^2$ is a saturated or unsaturated $C_{10}$-$C_{20}$alkyl.

8. The compound according to claim 5, where the compound is (R)-2-(3',3'-dimethyl-6-nitrospiro[chromene-2,2'-indolin]-1'-yl)ethyl tridecanoate.

* * * * *